A. N. LOVELACE.
Insect-Trap.

No. 224,196. Patented Feb. 3, 1880.

WITNESSES:
A. Schehl.
C. Sedgwick.

INVENTOR:
A. N. Lovelace
BY Munn &Co.
ATTORNEYS.

UNITED STATES PATENT OFFICE.

ALFRED N. LOVELACE, OF KNOXVILLE, TENNESSEE, ASSIGNOR TO HIMSELF AND SYLVANUS S. HOWELL, OF SAME PLACE.

INSECT-TRAP.

SPECIFICATION forming part of Letters Patent No. 224,196, dated February 3, 1880.

Application filed July 30, 1879.

*To all whom it may concern:*

Be it known that I, ALFRED N. LOVELACE, of Knoxville, in the county of Knox and State of Tennessee, have invented a new and Improved Insect-Trap, of which the following is a specification.

Figure 1:
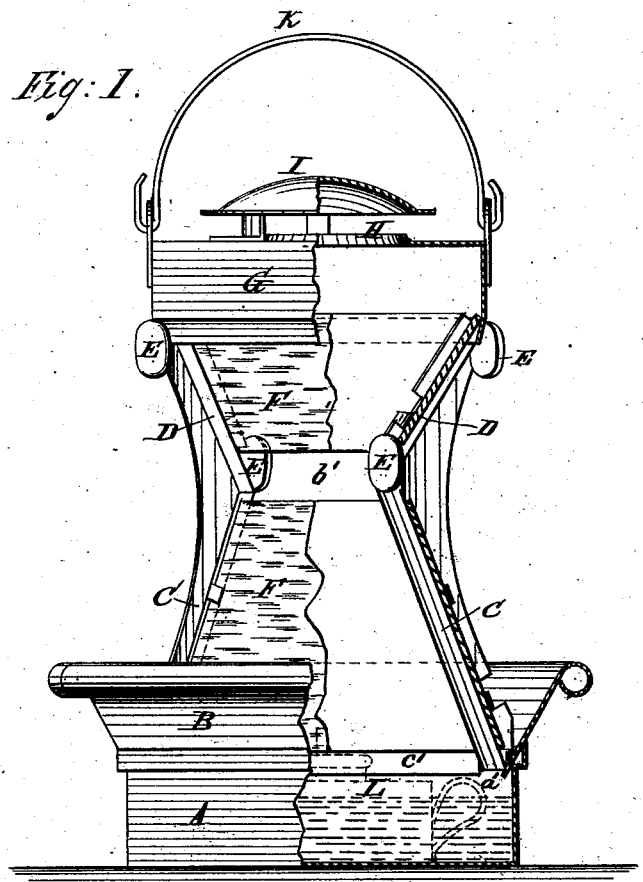
Figure 2:
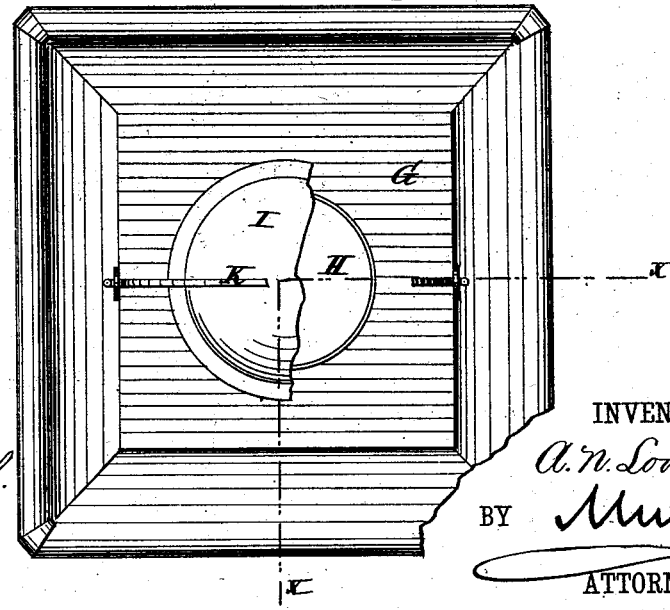

Figure 1 is a sectional elevation on line $x\ x$, Fig. 2. Fig. 2 is a plan of the trap.

Similar letters of reference indicate corresponding parts.

The object of this invention is to provide a trap for the flies, moths, and other insects that are destructive to bees and to vegetation, and that produce the larvæ so destructive to tobacco, cotton, &c.

The invention consists of a flat-bottomed rectangular pan, preferably of sheet metal, to the upper edge of which is fixed an outward-flaring rim, whose lower edge projects within the sides of the pan. From the corners of the pan four strips of metal or wood project upward and inward to about half the height of the trap, and from the ends of these four other strips project upward and outward to the top of the trap, which is provided with a central opening protected by a cowl, and fitted between these corner strips are plates of glass, and between the upper edges of the lower plates and the lower edges of the upper ones are open spaces, as also below the lower edges of the lower plates. Within this device a lamp or candle is placed to attract the insects.

In the drawings, A represents the pan; B, the rim, with an edge, $a'$, projecting within the pan. C are the flanged corner strips projecting upward and inward. D are the flanged strips projecting upward and outward. E are bosses to hold in the upper glass plates. F are the glass plates. G is the top of the device, provided with an aperture, H, over which is a cowl, I, and K is the handle.

The trap is prepared by placing oil, water, or other liquid in the pan, and a lighted lamp, L, or candle to attract the insects. The insects crawling up the inclined planes of glass will voluntarily enter or will fall into the trap through the openings $b'$ or $c'$ and into the liquid in the pan, whence they will be unable to escape; or should any of those entering attempt to get out through the opening in the top of the trap the cowl will prevent their direct exit, and they will be overcome by the smoke and heat there, and fall back into the liquid in the pan. The projecting edge $a'$ will prevent the insects from crawling out of the pan.

Having thus fully described my invention, I claim as new and desire to secure by Letters Patent—

The combination, in an insect trap, of a pan having the edged rim $a'$ B, the upwardly and inwardly inclined flanged corner strips C, the flanged strips D, projecting upwardly and outwardly, the glass plates F, held by boss E, and the top G, all arranged substantially as shown and described.

ALFRED N. LOVELACE.

Witnesses:
M. C. MOORE,
D. C. LUSBY.